United States Patent [19]

Lu

[11] Patent Number: 5,178,711
[45] Date of Patent: Jan. 12, 1993

[54] METHOD OF MANUFACTURING A GOLF CLUB SHAFT

[76] Inventor: Ben Lu, Fl. 2, No. 3, Lane 118, Ta Feng 2nd Rd., Kao Hsiung City, Taiwan

[21] Appl. No.: 814,837

[22] Filed: Dec. 31, 1991

[51] Int. Cl.⁵ ..................... A63B 53/14; B29C 65/00
[52] U.S. Cl. .................... 156/285; 156/156; 273/81 R; 273/81.5; 264/523
[58] Field of Search ............... 156/156, 173, 285, 286; 273/81.5, 81 R; 264/523, 535; 16/110 R; 43/23

[56] References Cited

U.S. PATENT DOCUMENTS

| | | | |
|---|---|---|---|
| 2,103,889 | 12/1937 | Brisick | 273/81.5 |
| 2,940,492 | 6/1960 | Curry et al. | 273/81.5 X |
| 3,087,729 | 4/1963 | Sullivan | 273/81.5 |
| 3,252,706 | 5/1966 | Rosasco, Sr. | 273/81.5 |
| 3,311,375 | 3/1967 | Onions | 273/81.5 |
| 3,716,433 | 2/1973 | Plummer | 273/81 R |
| 3,930,920 | 1/1976 | Kicherer | 156/156 |
| 4,183,776 | 1/1980 | Staub et al. | 156/156 |
| 4,819,939 | 4/1989 | Kobayashi | 273/81 R |

*Primary Examiner*—Jeff H. Aftergut
*Attorney, Agent, or Firm*—Morton J. Rosenberg; David I. Klein

[57] ABSTRACT

This invention relates to a method of manufacturing a golf club shaft and in particular to one including steps of prefabricating a conical tubular member having a larger end and a smaller end, connecting a handle grip with the larger end of the conical tubular member, and inserting a blowing tube into the handle grip and the conical tubular member for blowing pressurized gas into the handle grip and conical tubular member to harden the connection between the conical tubular member and the handle grip, whereby the golf club shaft is of sturdy strength and the handle grip will not be detached from the golf club shaft inadvertently.

2 Claims, 3 Drawing Sheets

METHOD OF MANUFACTURING A GOLF CLUB SHAFT

BACKGROUND OF THE INVENTION

It is found that the handle of the conventional golf club is simply made of rubber and the handle of such golf club is easily loosened thereby influencing the striking.

FIGS. 5A and 5B show a prior art golf club. As illustrated, the rod 5 is a conical tubular member provided with a head 51 at the smaller end and a rubber handle 52 at the larger end. In assembly, the larger end of the rod 5 is first struck with an adhesive tape 53 and then engaged with the rubber handle 52. Nevertheless, the rubber handle 52 will be loosened after having used for a certain period of time.

Further, the inventor has conducted a search for relevant patents and found the following references: Kobayashi (U.S. Pat. No. 4,819,939), Sullivan (U.S. Pat. No. 3,087,729), Rosasco (U.S. Pat. No. 3,252,706), Onions (U.S. Pat. No. 3,311,375) and Brisick (U.S. Pat. No. 2,103,889). However, these references may be clearly distinguished from the present invention in view of the following reasons.

The Kobayashi reference is directed to a grip for a golf club shaft comprising a porous inner layer and non-porous outer layer in which the outer layer can be easily detached from the inner layer and thus only the outer layer of the grip can be easily changed while leaving the inner layer thereof on the golf club shaft.

The remaining references have been carefully reviewed and analyzed, but are deemed no more pertinent than the reference already discussed.

Therefore, it is an object of the present invention to provide a golf club handle which may obviate and mitigate the above-mentioned drawbacks.

SUMMARY OF THE INVENTION

This invention relates to an improved golf club shaft.

It is the primary object of the present invention to provide a golf club shaft which is processed of sturdy strength without increasing its weight.

It is another object of the present invention to provide a golf club shaft of which the handle grip will not be detched from the shaft inadvertently.

It is still another object of the present invention to provide a golf club shaft of which the handle grip is easy to replace when desired.

It is still another object of the present invention to provide a golf club shaft which is easy to assemble.

It is a further object of the present invention to provide a golf club shaft which is safe in use.

Other objects and merits and a fuller understanding of the present invention will be obtained by those having ordinary skill in the art when the following detailed description of the invention is read in conjunction with the accompanying drawings.

DETAILED DESCRIPTION OF THE PREFERRED EMBODIMENT

Figure 1:
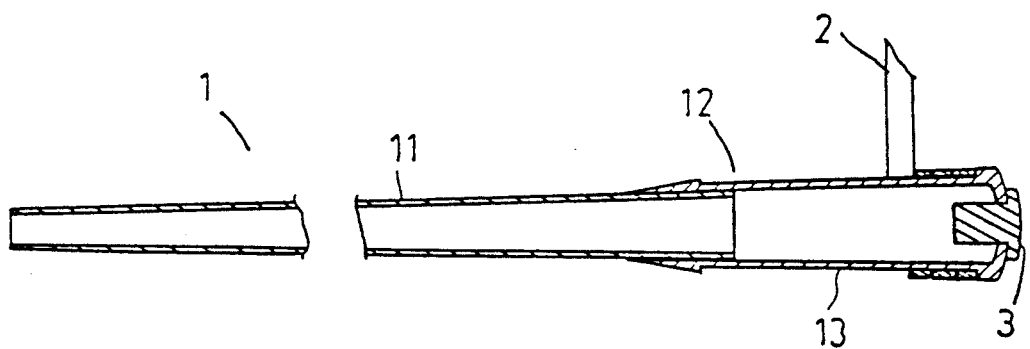
FIG. 1 is a perspective view of a golf club shaft according to the present invention.

With reference to the drawings and in particular to FIG. 1 thereof, the golf club shaft according to the present invention mainly comprises a body 1 which includes a conical tubular member 11, and a handle grip 12 connected with the conical tubular member 11. The handle grip 12 is covered by a wrapping 2 and has a cap 3 at its end.

Figure 2:
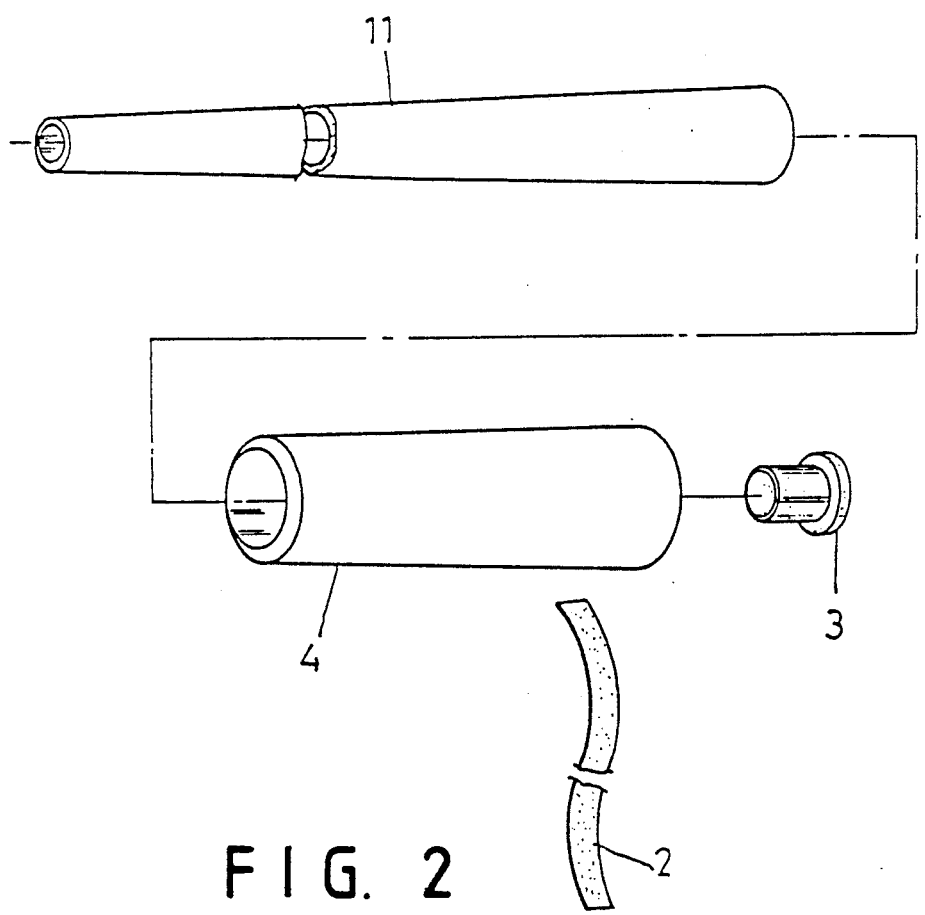
FIG. 2 is an exploded view of the golf club shaft.
Figure 3:
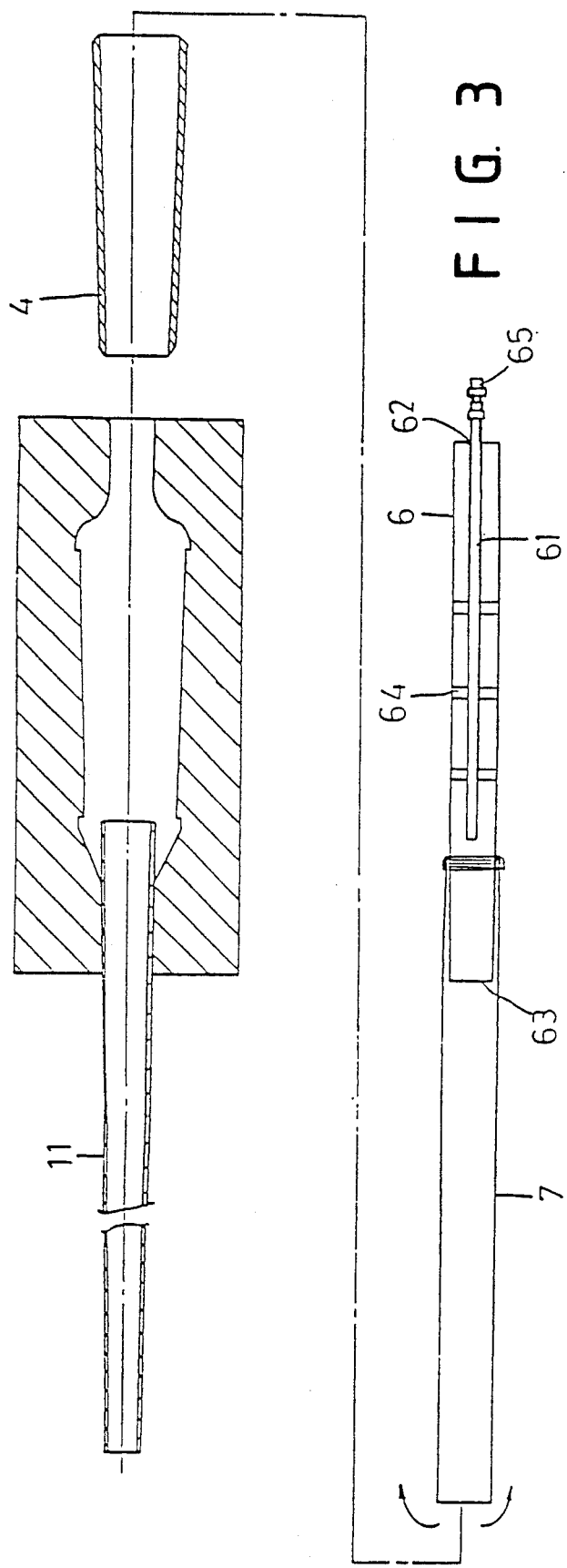
FIGS. 3 and 4 show the manufacturing process of the golf club shaft.
Figure 4:
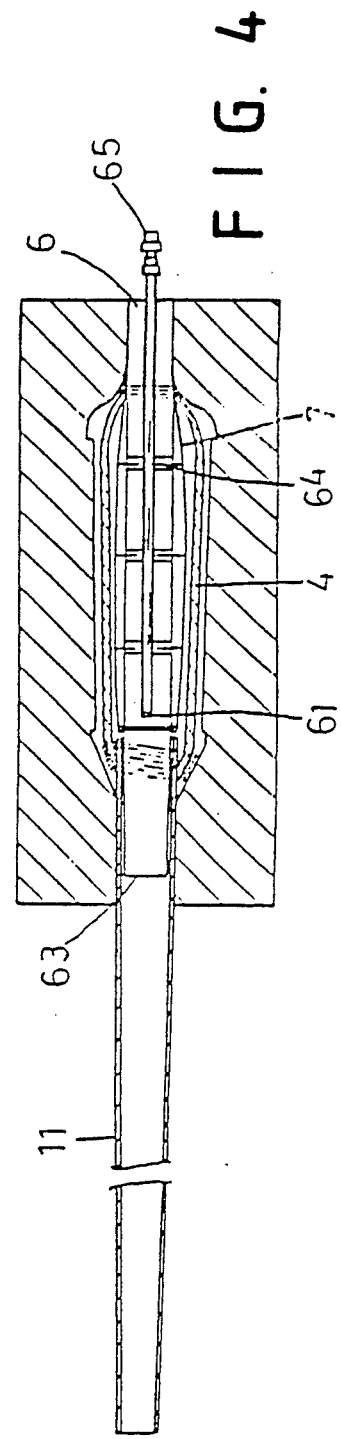
Figure 5A:
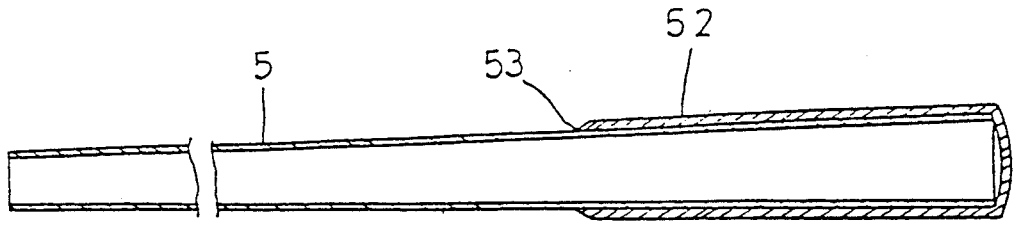
FIGS. 5A and 5B show a prior art golf club shaft.
Figure 5B:
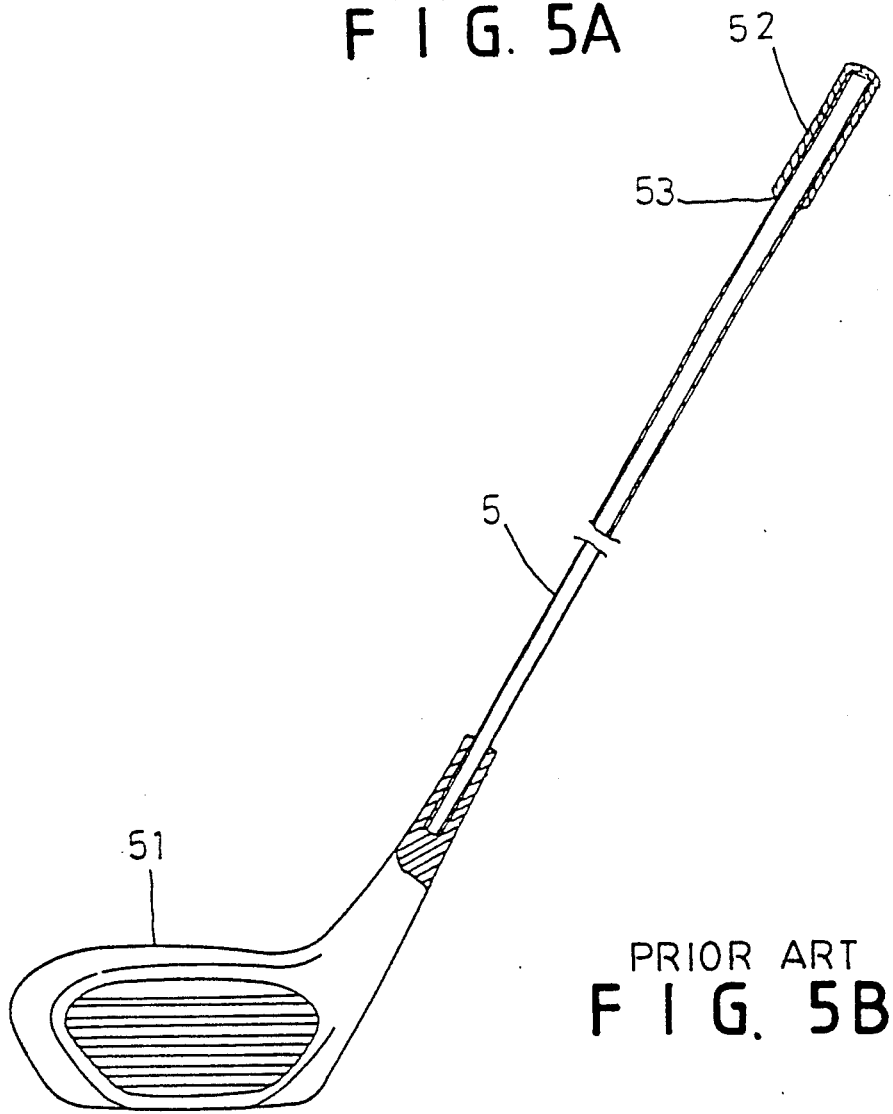

As shown in FIG. 2, the conical tubular member 11 is fabricated in advance. Then a fiber board immersed into resin is wrapped onto a tubular tube 4 which has an inner diameter approximately equal to the larger diameter of the conical tubular member 11. Thereafter, the tubular tube 4 is covered with a wrapping 2 which is heat-pressed to form the grip 12.

In assembly, a blowing tube 6, which is provided for facilitating the manufacture, which has a center hole 61 extending from the blowing end 62 but not through the tail or rear end 63. Along the length of the blowing tube 6 there are a plurality of holes 64 in communication with the center hole 61. The blowing tube 6 is further provided with a nozzle 65. The tail end 63 of the blowing tube 6 is used to form the inner diameter of the conical tubular member 11. Before applying pressure to the interior of the conical tubular member 11, a nylon tube 7 is attached to the the blowing tube 6 and then enclosed in an elongated tube 4. Thereafter, the elongated tube 4 is connected with the conical tubular member 11 by a piece of fiber cloth. Then the nylon tube 7 is attached to the blowing tube 6 and arranged into a mold. Thereafter, the blowing tube 6 is filled with pressurized air through the nozzle 65 of the blowing tube 6 and heated to a fixed contour. The pressurized gas is passed to the nylon tube 7 through the holes 64. The nylon tube 7 will be withdrawn after the connection.

As the center line of the conical tubular tube 4 and the conical tubular member 11 may be kept on the same line by adapting the blowing tube 6 to the mold thereby improving the quality and therefore decreasing the manufacturing cost.

When the conical tubular member 11 and the conical tubular shaft 4 are hardened into an integral member, the grip 12 may be provided with a recess 13 on which is covered with a wrapping 2. Further, the end of the grip 12 has a cap 3 at the end.

Consequently, the body 1 will be of high strength and will be rigidly connected with the handgrip 12. In addition, the wrapping 2 may be directly wound on the handgrip 12 making it easier to be assembled and replaced as required.

Moreover, the end of the handle grip 12 may be filled with a weight to adjust the weight and center of gravity as desired by the user.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. A method of fabricating a golf club shaft comprising the steps of:
   prefabricating a conical tubular member having a larger end and a smaller end;

connecting a handle grip with said larger end of said conical tubular member, said handle grip being formed by wrapping a piece of fiber plate to form a tubular tube which has an inner diameter approximately equal to a larger diameter of said conical tubular member; and, inserting a blowing tube into said handle grip and said conical tubular member for blowing pressurized gas into said conical tubular member and said handle grip to harden a connection between said conical tubular member and said handle grip, said handle grip having a blind hole at an end which is sealed with a cap and a recess on which there is a wrapping.

2. The method of fabricating a golf club shaft as recited in claim 1 wherein said blowing tube is provided with a plurality of outer holes on a wall and a center hole which is in communication with the outer holes and does not extend through said blowing tube.

* * * * *